United States Patent [19]

Forsman et al.

[11] Patent Number: 4,568,217
[45] Date of Patent: Feb. 4, 1986

[54] QUICK DISCONNECT COUPLING FOR A LIFT TRUCK ATTACHMENT

[75] Inventors: Earl R. Forsman; George A. Van den Heuvel, both of Houston, Tex.

[73] Assignee: Long Reach Manufacturing Co., Houston, Tex.

[21] Appl. No.: 591,706

[22] Filed: Mar. 21, 1984

[51] Int. Cl.⁴ .......................... B25G 3/18; F16B 21/00
[52] U.S. Cl. ................................... 403/322; 403/327; 403/319
[58] Field of Search ............... 414/667, 686, 671, 607; 403/327, 322, 324, 325, 316, 319

[56] References Cited

U.S. PATENT DOCUMENTS

| | | | |
|---|---|---|---|
| 1,460,082 | 6/1923 | Spahr | 403/325 |
| 3,534,990 | 2/1969 | Didtel et al. | |
| 4,230,434 | 10/1980 | Seaberg | 414/607 |
| 4,426,188 | 1/1984 | Wolf et al. | 403/330 X |
| 4,488,832 | 12/1984 | Kinshofer | 403/330 X |

*Primary Examiner*—Andrew V. Kundrat
*Attorney, Agent, or Firm*—Fulbright & Jaworski

[57] ABSTRACT

A quick disconnect coupling for releasably connecting a lift truck attachment to a lift truck carriage including a body adapted to be connected to the attachment. The body includes a vertically extending opening and includes a horizontal opening. A locking slide is vertically movable in the vertical opening for extending upwardly for attachment to and movable downwardly for disconnection from a lift truck carriage. A release and locking button is horizontally movable in the horizontally extending opening and extends through a bore in the locking slide. Coacting shoulders on the slide and on the button hold the slide in an extended and locked position when engaged and allow the slide to retract when disengaged. Spring means urge the button in a direction to engage the coacting shoulders. Releasing means on the button are provided for moving the button to a disengaging position. The body may include fastener openings on which includes a hexagonal recess for receiving a hexagonal nut or a circularly headed bolt whereby the body can be secured to the attachment by various types of fasteners.

8 Claims, 8 Drawing Figures

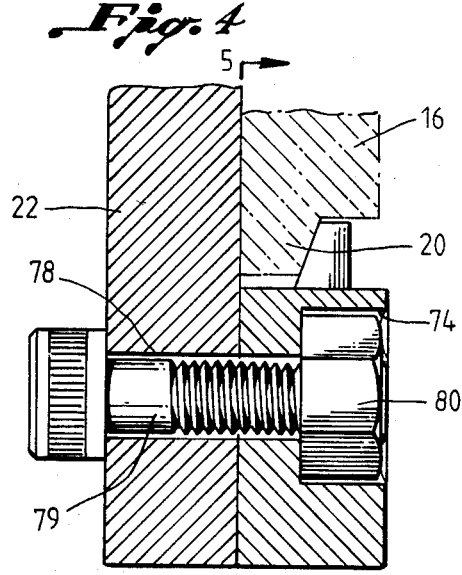
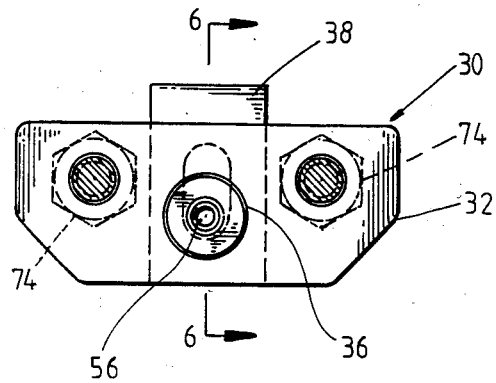
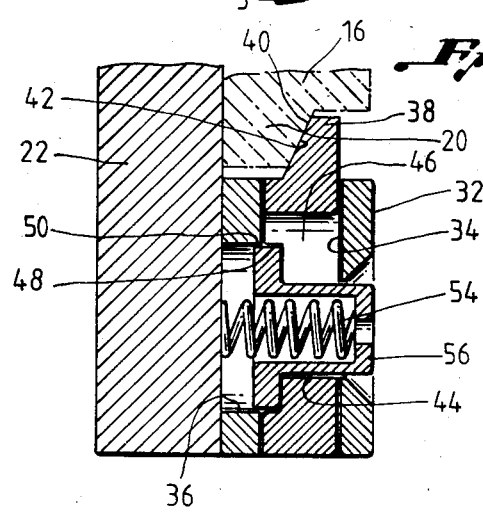
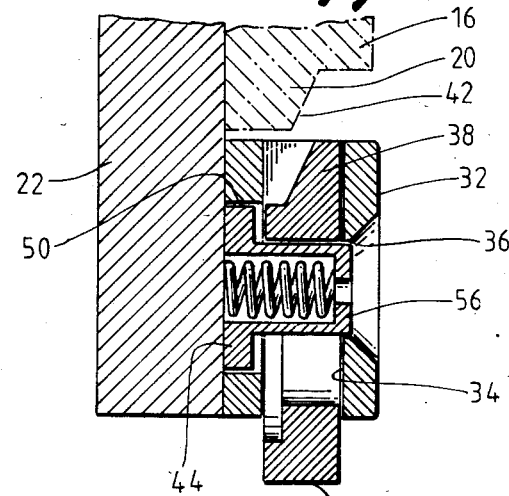
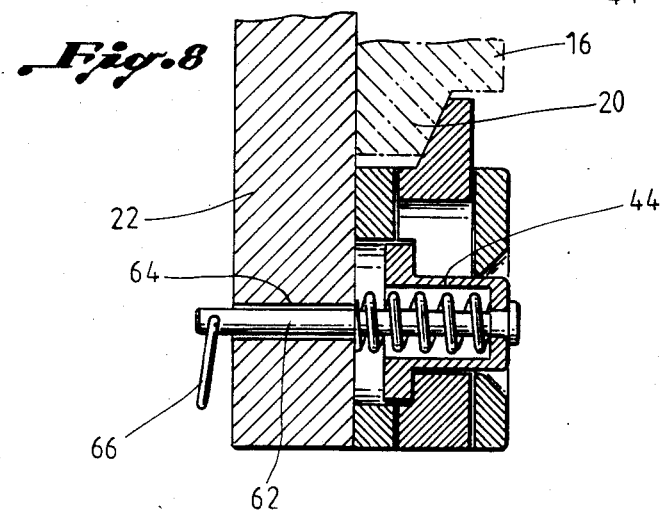

QUICK DISCONNECT COUPLING FOR A LIFT TRUCK ATTACHMENT

BACKGROUND OF THE INVENTION

It is known, as disclosed in U.S. Pat. No. 3,534,990 to utilize a quick disconnect coupling for connecting a lift truck attachment to a lift truck carriage plate. The present invention relates to an improved quick disconnect coupling for releasably connecting a lift truck attachment to a lift truck in which the coupling can be connected or disconnected by hand, and it is not necessary to remove parts from the coupling when connecting or disconnecting and therefor no parts are lost while installing or removing attachments from a lift truck. The coupling can be disconnected from either side of the attachment and the body includes fastener openings which will accommodate various types of fasteners for fastening the body to the lift truck attachment.

SUMMARY

It is an object of the present invention to provide a quick disconnect coupling for releasably connecting a lift truck attachment to a lift truck which includes a body which is adapted to be connected to a lift truck attachment. The body includes a vertically extending opening and a horizontally extending opening. A locking slide is vertically movable in the vertically extending opening for attachment to and disconnection from a lift truck. A release and locking button is horizontally movable in the horizontally extending opening in the body. Coacting shoulders are provided on the slide and on the button and the shoulders hold the slide in an extended position when engaged and allow the slide to retract when disengaged. Yieldable urging means acts on the button to urge the button in a direction to engage the coacting shoulders and releasing means on the button are provided for moving the button in a direction to disengage the coacting shoulders.

Yet a further object of the present invention is the provision wherein the releasing means includes a shoulder on the button exposed to the exterior of the body on one side of the attachment.

Still a further object of the present invention is wherein the releasing means includes a pin connected to the button and adapted to extend through the lift truck attachment for release on the side of the attachment opposite the body.

Yet a further object of the present invention is wherein the body includes a fastener opening on each side of the horizontally extending opening and each opening includes a hexagonal recess for receiving either a hexagonal nut or a circularly headed bolt whereby the body can be secured to an attachment by various types of fasteners.

Still a further object of the present invention is the provision of a quick disconnect coupling for releasably connecting a lift truck attachment to a lift truck carriage including a body adapted to be connected to the lift truck attachment. The body includes a vertically extending opening extending out of the top and bottom of the body and includes a horizontally extending opening extending through the body. A locking slide vertically moves in the vertically extending opening for extending upwardly for attachment to and movable downwardly for disconnection from a lift truck carriage. A release and locking button is horizontally movable in the horizontally extending opening in the body and through a bore in the locking slide. Coacting shoulders on the slide and on the button hold the slide in an extended and locked position with a carriage when engaged and allows the slide to retract and disengage from a carriage when disengaged. Spring means acts between the attachment and the button for urging the button in a direction to engage the coacting shoulders. Release means on the button are provided for moving the button in a direction to disengage the coacting shoulders.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 4 is an enlarged fragmentary elevational view, in cross-section, illustrating another type of fastener for connecting the releasable coupling to an attachment, FIG. 5 is a cross-sectional view taken along the line 5—5, FIG. 6 is a cross-sectional view taken along the line 6—6 showing the coupling in the engaged position, FIG. 7 is a view similar to that shown in FIG. 6 showing the coupling in a disengaged position, and FIG. 8 is a view similar to FIG. 6 illustrating an additional modified release mechanism.

DESCRIPTION OF THE PREFERRED EMBODIMENT

Figure 1:
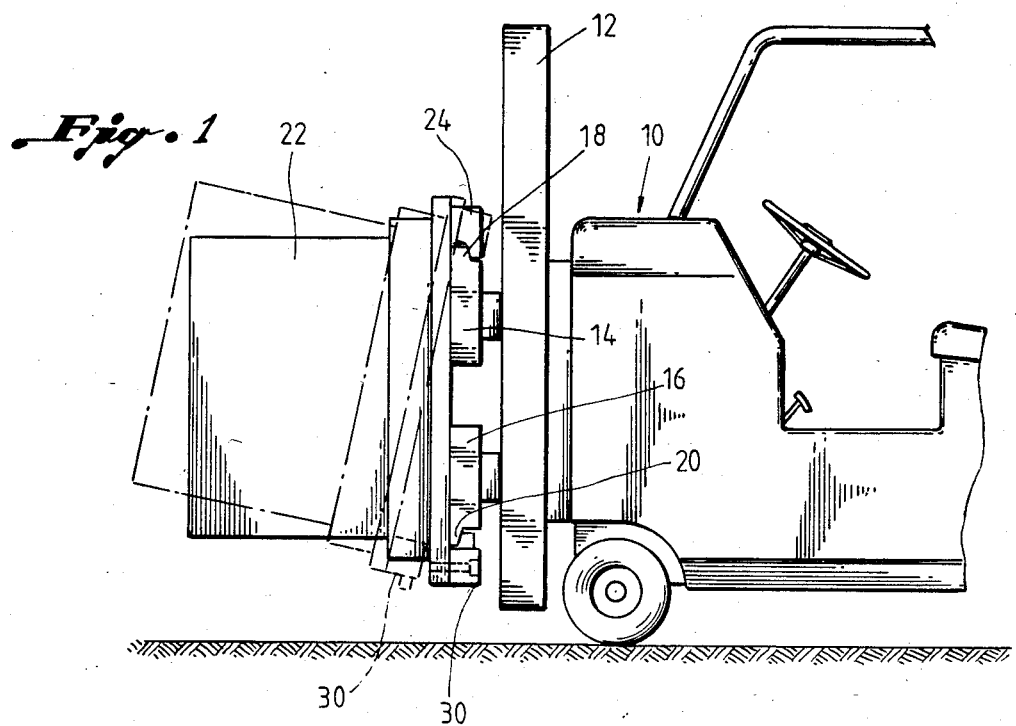
FIG. 1 is an elevational view illustrating the use of the quick disconnect coupling of the present invention for releasably connecting a lift truck attachment to a lift truck carriage.
Figure 2:
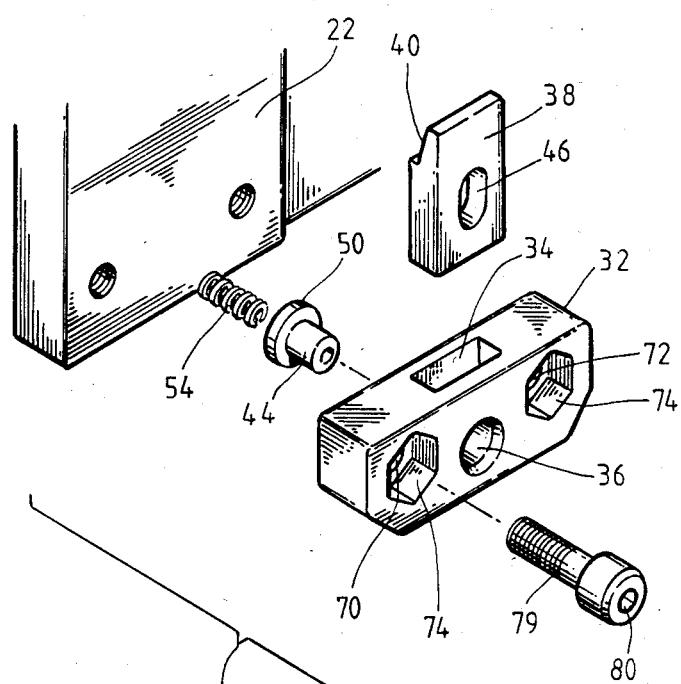
FIG. 2 is an exploded perspective view of the coupling of the present invention.

Referring now to the drawings and particularly to FIG. 1, a conventional lift truck is generally indicated by the reference numeral 10 which includes a mast 12 which is generally vertically movable and a lift truck carriage such as carriage bars 14 and 16 which include the usual connecting flanges 18 and 20, respectively. Various types of attachments 22 can be provided for attachment to the flanges 18 and 20 and thus to the carriage bars 14 and 16. Generally, the attachment 22 includes a fixed hook 24 at each outer edge which are permanently secured to the attachment 22. The hooks 24 coact with the flange 18 on the top carriage bar 14 for supporting the top of the attachment 22.

The present invention is directed to a quick disconnect coupling generally indicated by the reference numeral 30 which is attached to the outer bottom edges of the attachment 22 for coacting with the flange 20 of the lower truck carriage bar 16.

In FIG. 1, the attachment 22 is shown in solid lines with both the top hooks 24 and the bottom quick disconnect couplings 30 connected to the truck carriage. The dotted outline indicates that the bottom quick disconnects 30 have been released or is in the process of being connected to the flange 20 while the top hooks 24 are hooked to the flange 18. Thus, the attachment 22 is releasably connected to the truck carriage by locking and unlocking the quick disconnect couplings 30 after engaging the top hooks 24.

Referring now to FIGS. 2, 5, 6 and 7, the quick disconnect coupling 30 of the present invention includes a body 32 which is adapted to be connected to the lift truck attachment 22 as will be more fully described hereinafter. The body 32 includes a vertically extending opening 34 which extends out of the top and out of the bottom of the body 32. The body 32 also includes a horizontally extending opening 36 which intersects the vertically extending opening 34 and extends through the body 32. A locking slide 38 is vertically movable in the vertically extending opening 34 for extending upwardly (FIGS. 5 and 6) into a locking position engaging the flange 20 of the carriage bar 16 to lock the attachment 22 to the lift truck 10. Preferably, the locking slide 38 includes a tapered face 40 for coacting with the tapered face 42 of the flange 20. The locking slide 38 is also movable vertically in the vertical opening 34 into a downward or release position (FIG. 7) out of engagement with the flange 20 of the carriage bar 16 for disconnecting or connecting the attachment 22 to the lift truck 10. A release and locking button 44 is horizontally movable in the horizontal extending opening 36 in the body 32. The button 44 extends through a bore 46 in the locking slide 38 for retaining the slide 38 in the body 32. Coacting shoulders are positioned on the slide 38 and the button 44. Thus, slide 38 includes a coacting locking shoulder 48 and the button includes a coacting locking shoulder 50. The coacting locking shoulders 48 and 50 hold the slide 38 in an extended and locking position with the carriage 16 when engaged (FIG. 6) and when they are disengaged allow the slide 38 to move downwardly and disengage from the carriage 16.

Yieldably urging means such as a spring 54 is provided acting between the attachment 22 and the button 44 for yieldably urging the button 44 in a direction to engage the coacting locking shoulders 48 and 50. The button 44 includes a release means such as a release face 56 which is exposed through the horizontal opening 36 which can be moved inwardly in a direction to disengage the coacting shoulders 48 and 50 and allow the slide 38 to move downwardly.

FIG. 6 shows the quick disconnect coupling 30 with the locking slide 38 in the extended and locking position in engagement with the carriage 16 and held in the engaged position by the locking shoulders 48 and 50 on the slide 38 and the button 44, respectively. The locking shoulders 48 and 50 are held in the locking position by the spring 54. In FIG. 7, the end 56 of the button 44 has been pushed inwardly toward the attachment 22 thereby removing the coacting shoulder 50 from beneath the coacting shoulder 48 on the slide 38. The locking slide 38 may then move downwardly or be pushed downwardly by hand into the position shown in FIG. 7. The slide 38 will not fall out of the body 32 as it is supported by the button 44 extending through the bore 46 of the slide 38. The bottom end 60 of the slide 38 extends out of the vertical opening 34. When it is desired to re-engage or relock the coupling 30 the bottom end 60 is merely pushed upwardly and the spring 54 will move the button 44 outwardly to re-engage the coacting locking shoulders 48 and 50.

As shown in FIGS. 6 and 7 the coupling 30 may be disconnected from a position between the attachment 22 and the mast 12 by pushing in on the end 56 of the button 44. If desired, as best seen in FIG. 8, a pull pin 62 may be connected to the button 44 and extend through an opening 64 in the attachment 22 and be connected to a pull ring 66 whereby the quick disconnect coupling 30 may be released from the backside of the attachment 22.

Figure 3:
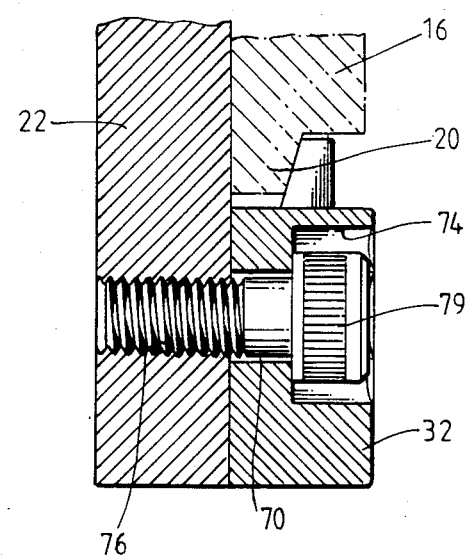
FIG. 3 is an enlarged fragmentary elevational view, in cross-section, illustrating one type of fastener for connecting the releasable coupling to an attachment.

The body 32 may be suitably attached to the attachment 22 by any suitable means. One feature of the present invention is the provision of a fastening structure whereby the body 32 can be secured to the attachment 22 by a plurality of types of fasteners. The body 32 includes a fastener opening 70 and 72 on each side of the horizontally extending opening 36 for receiving a fastener for securing the body 32 to the attachment 22. Some types of attachments 22 include a threaded hole 76 (FIG. 3) and some types of attachments 22 include an unthreaded hole 78 (FIG. 4). The body 32 is adapted to accommodate various types of fasteners. Thus, the openings 70 and 72 each include an hexagonal pocket 74. The hexagonal pockets 74 are sized to receive a hexagonal nut but are also sized to allow a round headed bolt to be rotatable therein. Thus, referring to FIGS. 2 and 3, in the case where the attachment 22 includes threaded openings 76, a round headed bolt 79 may be used in the hexagonal pocket 74, the openings 70 and 72 and screwed into the threaded openings 76 in the attachment 22. The bolt 79 is rotated by means of an Allen head recess 80. On the other hand, and referring to FIG. 4 in which the attachment 22 has smooth bore openings 78, a similar bolt 79 may again be used. In this case a hexagonal nut 80 is provided in the hexagonal pockets 74 to provide the threads while the bolt 79 is rotated again by an Allen head wrench. Of course, other and further means for attaching the body 32 to the attachment 22 may be provided.

The present quick disconnect coupling can provide a rapid connection by merely moving the slide 38 upwardly by hand, will provide a rapid disconnect by pushing the end 56 of the button 44 or pulling the ring 66 attached to the button 44 thereby allowing the slide 38 to fall. No tools are required to connect or disconnect the coupling 30 to the lift truck carriage bars 14 and 16 and it is not necessary to remove parts from the coupling assembly when connecting or disconnecting the attachment 22 from the truck 10 and therefore no parts are lost or misplaced while installing or removing the attachment 22 from a lift truck 10.

The present invention, therefore, is well adapted to carry out the objects and attain the ends and advantages mentioned as well as bthers inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. A quick disconnect coupling for releasably connecting a lift truck attachment to a lift truck having a downwardly directed flange comprising,
   a body, said body having a vertically extending opening extending entirely through the body and having a horizontally extending opening, said body being adapted to be connected to a lift truck attachment,
   a locking slide having an upwardly directed flange and vertically movable for extending out of the vertically extending opening for attachment to and movable into the opening for disconnection from the flange of a lift truck,
   a release and locking button horizontally movable in the horizontally extending opening in the body, coacting shoulders on the slide and on the button, said shoulders holding the slide in an extended upward locking position when engaged and allowing the slide to retract into the opening when disengaged, yieldably urging means acting on the button urging the button in a direction to engage the coacting shoulders, and release means on the button for moving said button in a direction to disengage said coating shoulders.

2. The apparatus of claim 1 wherein said release means includes, a release shoulder on the button exposed to the exterior of the body.

3. The apparatus of claim 1 wherein said release means includes, a pin connected to the button and adapted to extend through the lift truck attachment for release on the side of the attachment opposite the body.

4. The apparatus of claim 1 wherein the body includes, a fastener opening on each side of the horizontally extending opening, each opening including a hexagonal recess for receiving a hexagonal nut or a circularly headed bolt whereby the body can be secured to an attachment from either side of the attachment.

5. A quick disconnect coupling for releasably connecting a lift truck attachment to a lift truck carriage having a downwardly directed flange comprising, a body, said body having a vertically extending opening extending out of the top and bottom of the body, and having a horizontally extending opening extending through the body, said body being adapted to be connected to a lift truck attachment, a locking slide having an upwardly directed flange and vertically movable for extending out of the vertically extending opening for extending upwardly for attachment to and movable downwardly into the opening for disconnection from the flange of a lift truck carriage, a release and locking button horizontally movable in the horizontally extending opening in the body, said locking slide having an enclosed bore therethrough through which the button extends thereby retaining the slide in the body, coacting shoulders on the slide and on the button, said shoulders holding the slide in an extended upward locking position with a carriage when engaged and allowing the slide to retract into the opening and disengage from a carriage when disengaged, spring means adapted to be positioned between the attachment and the button for urging the button in a direction to engage the coacting shoulders, and release means on the button for moving said button in a direction to disengage said coacting shoulders.

6. The apparatus of claim 5 wherein said release means includes, a release shoulder on the button exposed to the exterior of the body.

7. The apparatus of claim 5 wherein said release means includes, a pin connected to the button and adapted to extend through the lift truck attachment for release on the side of the attachment opposite the body.

8. The apparatus of claim 5 wherein the body includes, a fastener opening on each side of the horizontally extending opening, each opening including a hexagonal recess for receiving a hexagonal nut or a circularly headed bolt whereby the body can be secured to an attachment by various types of fasteners.

* * * * *